(12) United States Patent
Burkman et al.

(10) Patent No.: US 10,252,635 B2
(45) Date of Patent: Apr. 9, 2019

(54) VEHICLE HIGH VOLTAGE INTERLOCK

(71) Applicant: Ford Global Technologies, LLC, Dearborn, MI (US)

(72) Inventors: Wesley Edward Burkman, Dearborn, MI (US); Robert Bolduc, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 15/260,847

(22) Filed: Sep. 9, 2016

(65) Prior Publication Data

US 2018/0072179 A1   Mar. 15, 2018

(51) Int. Cl.
| | |
|---|---|
| *B60L 11/18* | (2006.01) |
| *H02H 7/18* | (2006.01) |
| *H02H 9/04* | (2006.01) |
| *B60W 10/26* | (2006.01) |
| *B60W 20/00* | (2016.01) |

(52) U.S. Cl.
CPC ....... *B60L 11/1864* (2013.01); *B60L 11/1859* (2013.01); *H02H 7/18* (2013.01); *H02H 9/041* (2013.01); *B60W 10/26* (2013.01); *B60W 20/00* (2013.01); *Y02T 10/7005* (2013.01); *Y10S 903/907* (2013.01)

(58) Field of Classification Search
CPC .................. B60L 11/1864; B60L 11/1859
See application file for complete search history.

(56) References Cited

U.S. PATENT DOCUMENTS

| | | | | |
|---|---|---|---|---|
| 5,862,030 | A * | 1/1999 | Watkins, Jr. | ........... H02H 5/043 219/494 |
| 2013/0106171 | A1* | 5/2013 | Ferrel | ................... B60L 3/0061 307/9.1 |
| 2013/0106350 | A1* | 5/2013 | Ono | ..................... H01M 10/44 320/109 |
| 2015/0061413 | A1* | 3/2015 | Janarthanam | ........ H05K 5/0208 307/328 |
| 2016/0052409 | A1 | 2/2016 | Sun et al. | |
| 2016/0096438 | A1 | 4/2016 | Grimes et al. | |

\* cited by examiner

*Primary Examiner* — Scott Bauer
(74) *Attorney, Agent, or Firm* — David Kelley; Brooks Kushman P.C.

(57) ABSTRACT

A high-voltage interlock system includes a first module including a contactor and a shunt connection, and a second module, having first and second circuits, coupled with the first module via first and second wires. The second module, in response to impedance of the shunt connection exceeding a threshold, inhibits a signal to engage the contactor. The impedance is measured across the first and second wires while the first wire is multiplexed with low-voltage power to energize a coil of the contactor, and the second circuit is multiplexed with the signal to engage the contactor.

17 Claims, 6 Drawing Sheets

VEHICLE HIGH VOLTAGE INTERLOCK

TECHNICAL FIELD

This disclosure relates to a high-voltage interlock configuration for high voltage components of a hybrid vehicle powertrain.

BACKGROUND

A hybrid-electric vehicle (HEV) or all-electric vehicle (EV) has a traction battery to store and provide energy for vehicle propulsion. The traction battery, also referred to as a high-voltage battery, typically operates at over 100 volts. The traction battery operates at a voltage greater than a conventional vehicle battery, also referred to as an auxiliary battery or a low-voltage (12 volt) battery. The industry standard is that low voltage is less than 60 volts Direct Current (DC) and 30 volts Alternating Current (AC) calculated by root mean square (RMS). Voltages above this threshold are considered high voltage. The traction battery also has greater current capacity in comparison to a conventional battery, which can be in excess of 100 amps·hours. This increased voltage and current is used by an electric motor(s) to convert the electrical energy stored in the battery to mechanical energy in the form of a torque which is used to provide vehicle propulsion. The battery is connected to the electric motor via wires, connectors, capacitors, and other electrical components.

SUMMARY

A high-voltage interlock system includes a first module including a contactor and at least one shunt connection. The system further includes a second module, having first and second circuits, coupled with the first module via a first wire multiplexed with low-voltage power and a second wire. The second module is configured to, in response to impedance of the at least one shunt connection measured across the first and second wires being greater than a predetermined value, disengage the contactor.

A high-voltage interlock system includes a first module including a contactor and a shunt connection. The system further includes a second module, having first and second circuits, coupled with the first module via first and second wires. The second module is configured to, in response to impedance of the shunt connection exceeding a threshold, inhibit a signal to engage the contactor. The impedance is measured across the first and second wires while the first wire is multiplexed with low-voltage power to energize a coil of the contactor, and the second circuit is multiplexed with the signal to engage the contactor.

A method of preforming a high-voltage interlock includes transmitting, to a pre-charge contactor coil via a pre-charge terminal, a turn-on signal in response to a pre-charge request while an impedance, measured across the pre-charge terminal and a power terminal, is below a threshold, energizing main contactor coils, after a predetermined time, to couple a high-voltage battery to a high-voltage subsystem, and in response to the impedance exceeding the threshold, de-energizing the main contactor coils to isolate the battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A electric vehicles including battery electric vehicles (BEVs), hybrid electric vehicles (HEVs) and plug-in hybrid electric vehicles (PHEVs) typically include a high-voltage battery that is used to provide power to one or more electric components such as an electric machines used to provide propulsive force. Typically the high-voltage battery and high-voltage subsystem requires at least one high-voltage interlock (HVIL) circuit on connectors, interfaces, components, and modules. The HVIL is configured to provide a verification signal to the battery interfaces and subsystems when the interface is properly connected. The proper connection includes confirming or verifying that connectors are properly seated. For a connection to be properly seated, the connection must be coupled such that all terminals are fully engaged. Some connectors include main terminals and secondary terminals in which the main terminals are coupled first and after the main terminals have traveled a predetermined distance, the secondary terminals are coupled. For example, a connection may include a plug and a receptacle. The plug may include 4 flat or spade male terminals that are configured to be inserted into the receptacle that has 4 female terminals configured to accept the male terminals.

The length or orientation of the male terminals with respect to the female terminals may be such that 2 main male terminals first make connection with 2 main female terminals and must be inserted a predetermined distance into the female terminals before the 2 secondary male terminals are positioned such that they can make contact with the secondary female terminals. This reduces access to a conductive part of an open interface (e.g. electrical connector) when a high-voltage is present as the high voltage may be conditional upon the secondary terminals being connected, and connection may be designed such that the secondary terminals are only connected after the main terminals are connected and there is no exposed conductive surface of the main terminals. Thus, the secondary terminals may be verified as fully closed before energizing high-voltage components or subsystems. The secondary terminals of some HVIL circuits may include a 'shorting bar' that is coupled with a connector such that a closed electrical circuit is formed when the interface is closed. This circuit typically has a supply wire running from a control module to the interface, and a separate return wire running from the interface back to the control module. The supply side wire and return side wire are connected to circuitry in the control module used to determine if the circuit is open or closed.

In some embodiments a device with an HVIL circuit also may have other circuits running from the control module to that device. Aspects of those existing circuits may be used as the supply of the HVIL circuit. In another embodiment, aspects of those existing circuits are used as both supply and return lines of the HVIL circuit. This configuration provides the same level of functionality using 1 or 2 less wires and their respective terminals on the control side, thereby reducing costs and increasing reliability. This configuration also provides the same level of functionality using 1 or 2 less pins and their associated circuits on the device side (e.g., module) with the interface and the control module. For example, contactor power and pre-charge control wires and associated functionality may be multiplexed such that the wires are dual purposed.

This may be implemented such that no additional hardware is required in the control module, and this implementation may maintain the same level of fault detection as a separate HVIL circuit. A typical challenge with sharing the contactor power and HVIL circuits is that an intermittent connection at the shorting bar may cause the vehicle to lose power to the contactors. However, the implementation proposed here does not have the main contactor power in series with the shorting bar. Also, placing the pre-charge contactor coil in series with the shorting bar ensures that, by the time the vehicle is moving (and has a greater likelihood of intermittent connections due to vibration), the pre-charge contactor is no longer required to be closed. In alternative embodiments, the implementation proposed here may be applicable by placing a shorting bar in series with an auxiliary or DC fast charge contactor, such that if a connection of the shorting bar were intermittent, the vehicle would not lose power to the traction motors. Generally, the order of events at key-on include:

1. Close a first main contactor by energizing the first main contactor coil.
2. Close pre-charge contactor in parallel with that first main contactor by energizing the pre-charge contactor coil.
3. Wait for a predetermined time that is based on a voltage across the load exceeding a voltage threshold as the voltage increases to the battery voltage. The rate at which the voltage across the load increases may be regulated by an electric component such as a pre-charge resistor.
4. After the predetermined time associated with the load being within a certain number of volts of the battery or exceeding the threshold, close the second main contactor by energizing the second main contactor coil.
5. Open the pre-charge contactor after the positive main contactor is closed.

The purpose of the pre-charge circuit is to limit an inrush current to the load and main contactors when the load is connected to an energy source such as the high-voltage battery.

Figure 1:
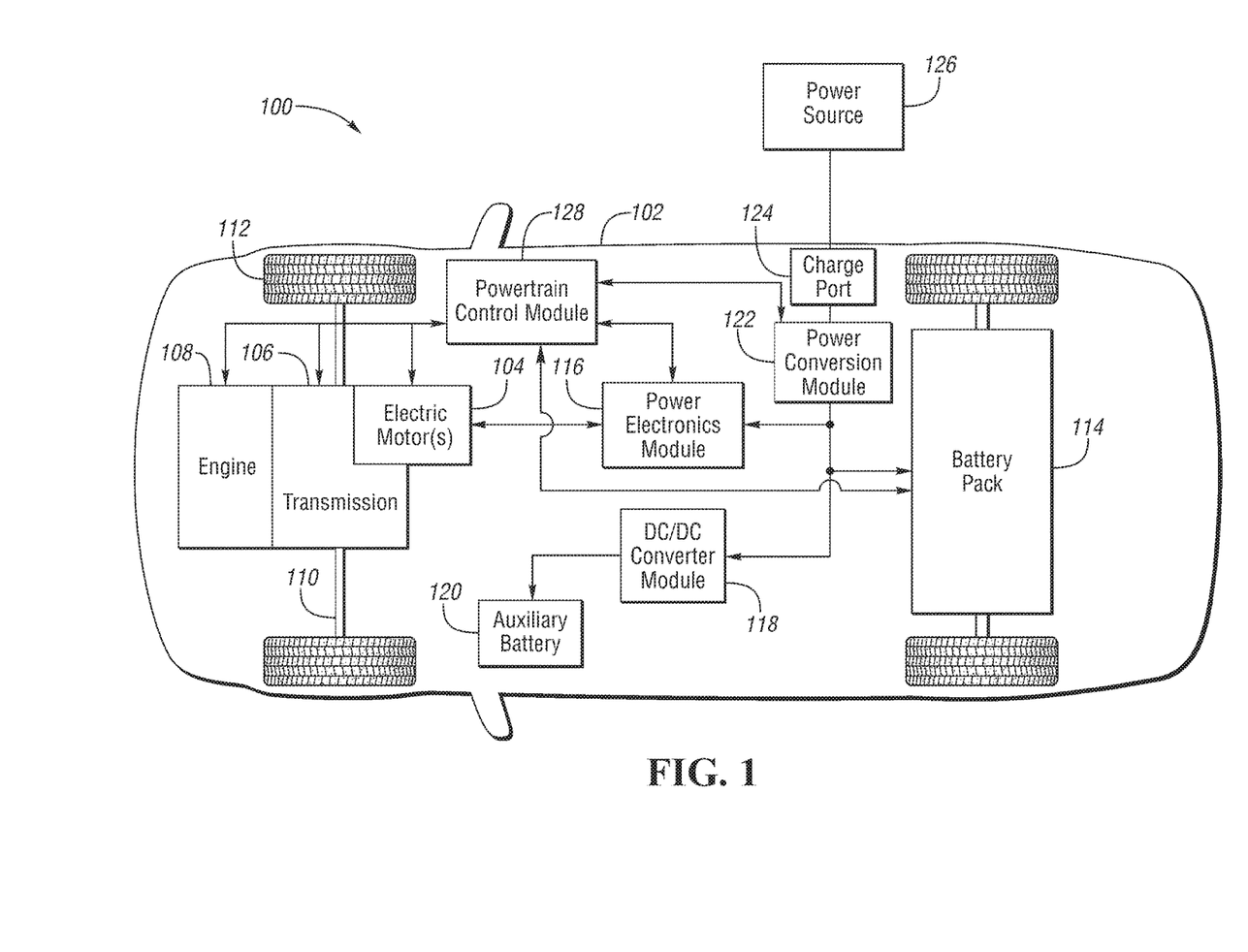
FIG. 1 is a block diagram of a hybrid-electric vehicle illustrating powertrain and electrical systems.

FIG. 1 depicts an example of a plug-in hybrid-electric vehicle 100. The plug-in hybrid-electric vehicle 100 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 114 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage vehicle system which includes the electric motor(s) 104, the power electronics module 116, the DC/DC converter module 118, the power conversion module 122, and the battery pack 114.

Figure 2:
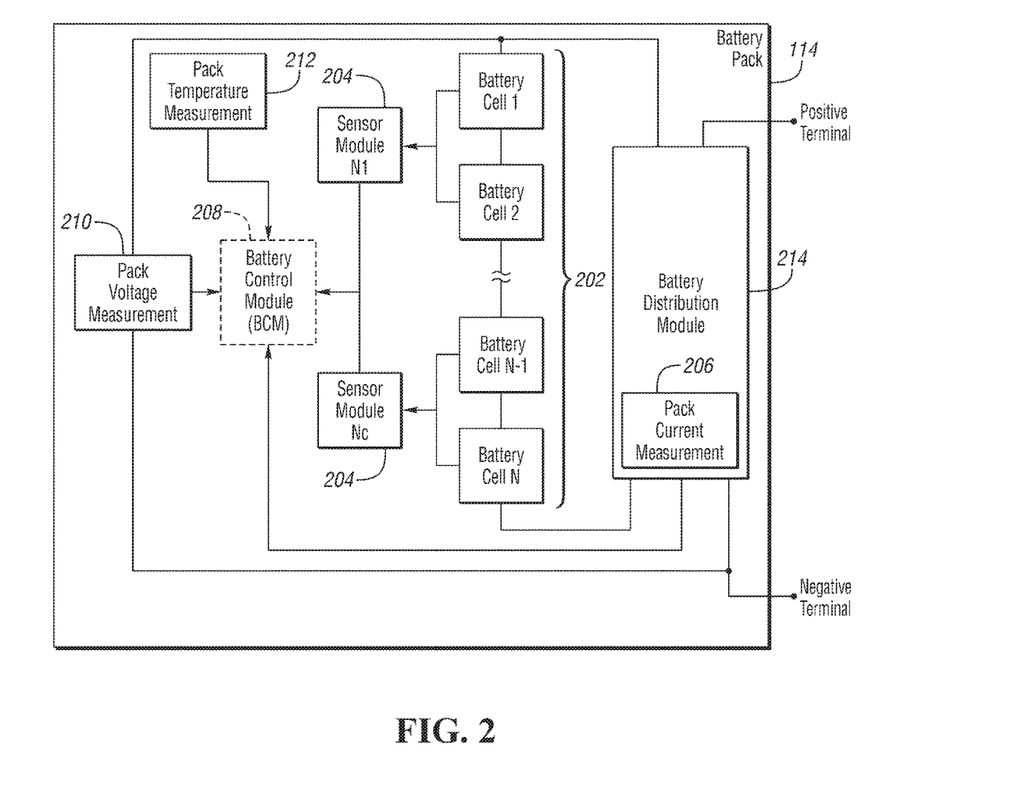
FIG. 2 is a block diagram of a battery configuration illustrating battery cells, battery cell monitoring components and controlling systems.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 114 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 114. The BCM 208 may monitor several battery pack level characteristics such as pack current measured by a current sensor 206, pack voltage 210 and pack temperature 212.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 114 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 114 may also contain a battery distribution module (BDM) 214 which enables the flow of current into and out of the battery pack 200.

Figure 3:
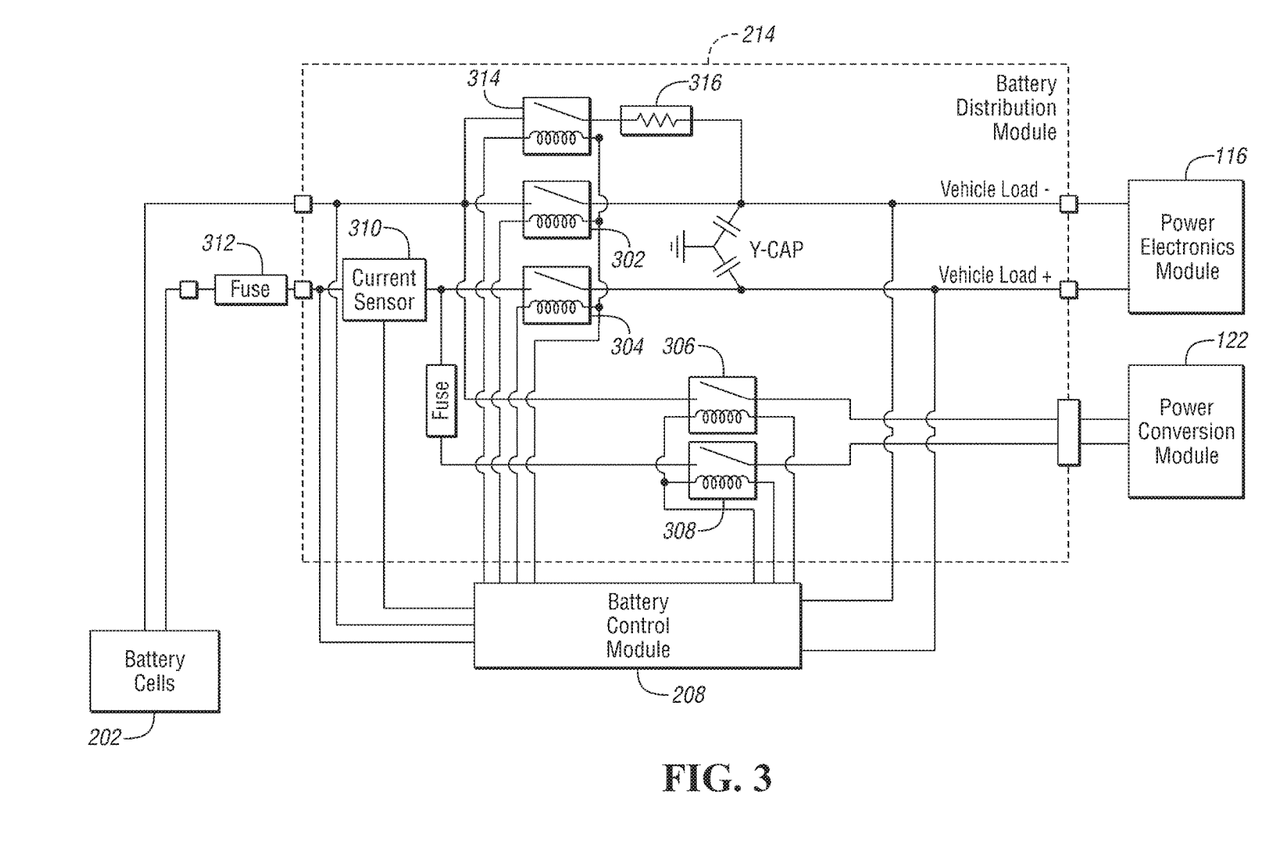
FIG. 3 is a schematic diagram of a battery distribution module (BDM) of a hybrid-electrical vehicle.

FIG. 3 is an illustration of a power electronics distribution module 214. This battery distribution module (BDM) 214 contains the high voltage switches (302, 304, 306, 308 and 314) used to connect and disconnect the high voltage components. These high voltage switches (302, 304, 306, 308 and 314) can be relays, or other electro-mechanical switches. The battery cells 202 provide the voltage and current which flows through switches 302 and 304 to the power electronics module 116. The current is measured in a current sensor block 310. The current may flow as a result of switch 304 being closed and either switch 302 or 314 being closed with power moving between the battery cells 202 and the power electronics module 116. Switch 314 in conjunction with resistor 316 is a pre-charge circuit which is used to limit the current flow into system while the system is powering up. Also, current may flow as a result of switches 308 and 306 being closed with power moving between the battery cells 202 and the power conversion module 122. The current also may also pass through a CID 312 which can include a fuse or circuit breaker, however the CID is not required as the system may be configured to protect the circuit over the complete range of operating amp-hour time periods.

Figure 4:
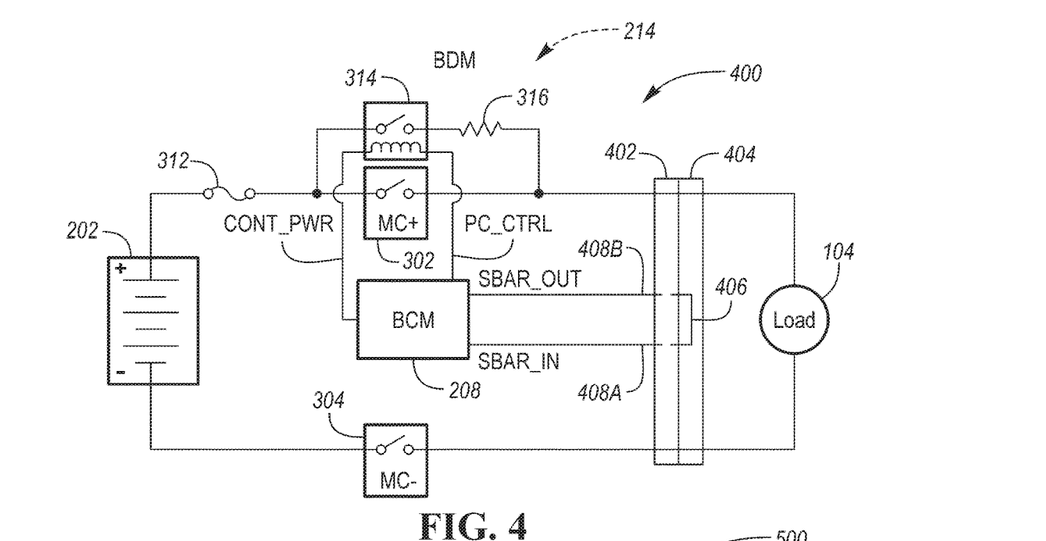
FIG. 4 is a schematic diagram of a high voltage interlock.

FIG. 4 is a schematic diagram of a high voltage interlock system 400. In this illustration, a high-voltage battery array 202 is coupled with a load 104, such as an electric machine, via a fuse 312, positive main contactor 302, negative main contactor 304, and a connector that includes a receptacle 402 and a plug 404. The positive main contactor 302 and negative main contactor 304 may be an electro-mechanical switch such as an electromechanical solenoid or relay. In parallel with the positive main contactor 302 is a pre-charge contactor 314 having a series resistance 316. Like the positive main contactor 302, the pre-charge contactor 314 may be an electro-mechanical switch or a solid state switch as described above. The connector is configured to provide an electric connection between the battery 202 and the load 104 thus allowing power to be transferred between the battery array 202 and the load 104. The connector is also shown including a first sense line 408A and second sense line 408B and having a shunt 406 also referred to as a "shorting bar" that is configured to make an electric connection between the first sense line 408A and the second sense line 408B. The shunt 406 may be separate from the connector, or the shunt 406 may be integrated into the connector such that confirmation or verification that the main terminals are properly seated.

Figure 5A:
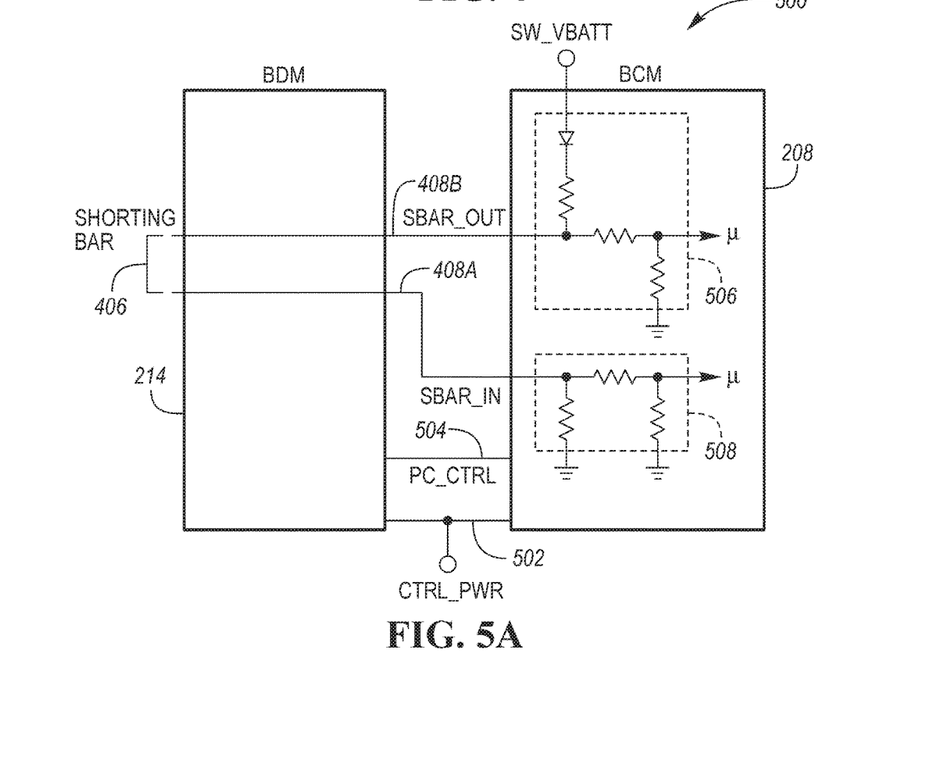
FIG. 5A is a schematic diagram illustrating an internal circuit to provide a high voltage interlock, pre-charge contactor control, and contactor power over four conductors between a Battery Control Module (BCM) to the BDM.

FIG. 5A is a schematic diagram illustrating internal circuits 500 to provide high voltage interlock, pre-charge contactor control, and contactor power over four conductors between the BCM to the BDM. The four conductors are a first sense line 408A, second sense line 408B, a low voltage power 502, and a pre-charge contactor control signal 504. The low voltage power 502, also referred to as control power (CTRL_PWR), is typically a positive DC voltage from an auxiliary battery such as a vehicle's 12V battery. The pre-charge control signal 504 (PC_CTRL) is typically a connection through a switch to the vehicle 12V ground. The pre-charge control signal may also be a digital signal transmitted from the BCM 208 to the BDM 214 that is then decoded to activate the pre-charge contactor via an internal driver in the BDM. In other embodiments, a MOSFET, a smart MOSFET, BJT or other solid state switch located in the BDM 214 may be used to drive the pre-charge contactor in response to the pre-charge control signal 504. A smart MOSFET is a MOSFET that is configured to provide current limiting functionality, over temperature protection, over voltage protection, electro static discharge (ESD) protection, or diagnostic output. Smart MOSFETs may be configured as high or low side switches. Also, shown is a first and second sense circuit, the second sense circuit 506 provides isolated power to detect an impedance of the shunt 406 and the electrical connection of the shunt 406. This simplified representative circuit of the second sense circuit 506 includes a diode configured to flow a current from a low-voltage battery through a resistor to the shunt 406 while having a resistance network to provide voltage isolation via allowing a current through the resistance. Also, a simplified representative circuit of a first sense circuit 508 includes three resistor in a "pi" configuration to provide isolation of the first sense connector while allowing the impedance to be measured between the first sense connector and the second sense connector.

Figure 5B:
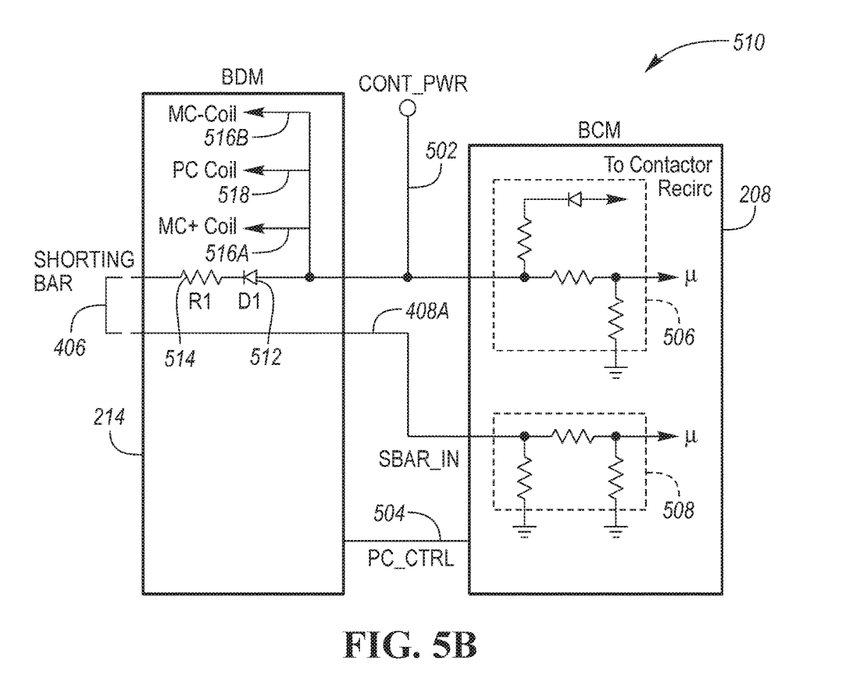
FIG. 5B is a schematic diagram illustrating an internal circuit to provide a high voltage interlock, pre-charge contactor control, and contactor power over three conductors between the BCM to the BDM.

FIG. 5B is a schematic diagram illustrating an internal circuit 510 to provide a high voltage interlock, pre-charge contactor control, and contactor power over three conductors within a connector. The three conductors are a first sense line 408A, a pre-charge contactor control signal 504, and a multiplexed power line that multiplexes the functionality of a second sense line and a low voltage power 502 source. The pre-charge contactor control signal 504 (PC_CTRL) may be a digital signal transmitted from the BCM 208 to the BDM 214 that is then decoded to activate the pre-charge contactor. In other embodiments, a solid state switch located in the BDM, such as a MOSFET, a smart MOSFET or bipolar junction transistor BJT, may be used to drive the pre-charge contactor via the pre-charge control signal 504. The multiplexed power may be coupled with a second sense circuit 508. The second sense circuit 508 provides isolated power with an ability to detect an impedance of the shunt 406 and the electrical connection of the shunt 406. This simplified representative circuit of the second sense circuit 508 includes a diode configured to flow a current from a low-voltage battery through a resistor to the shunt 406 while having a resistance network to provide voltage isolation via allowing a current through the resistance. Also, a simplified representative circuit of the first sense circuit 508 includes three resistors in a "pi" configuration to provide isolation of the first sense connector while allowing the impedance to be measured between the first sense line and the second sense line.

Here, the multiplexed power line that multiplexes the second sense line and the low voltage power source 502 is shown to provide power to BDM electric circuitry including a positive main contactor coil 516A, a negative main contactor coil 516B, and the pre-charge coil 518, and is used to detect the presence and impedance of the shunt 406. The use of a diode 512 and a resistor 514 are used to control the flow of power to the shunt and limit the current used when the shunt is in place such that power remains available for the BDM electric circuitry. The type of resistor may be a high precision resistor such that when measuring the impedance of the shunt 406 in series with the resistor 514 and diode 512, the impedance of the shunt 406 and the connections of the shunt to the BDM may be accurately determined. Further, as the power flowing from CONT_PWR 502 is multiplexed onto the same multiplexed power line, by having the return path of CONT_PWR 502 independent from the first sense connector 408A also allows separate paths of current flows to aid in isolation such that an accurate read may be obtained.

Figure 5C:
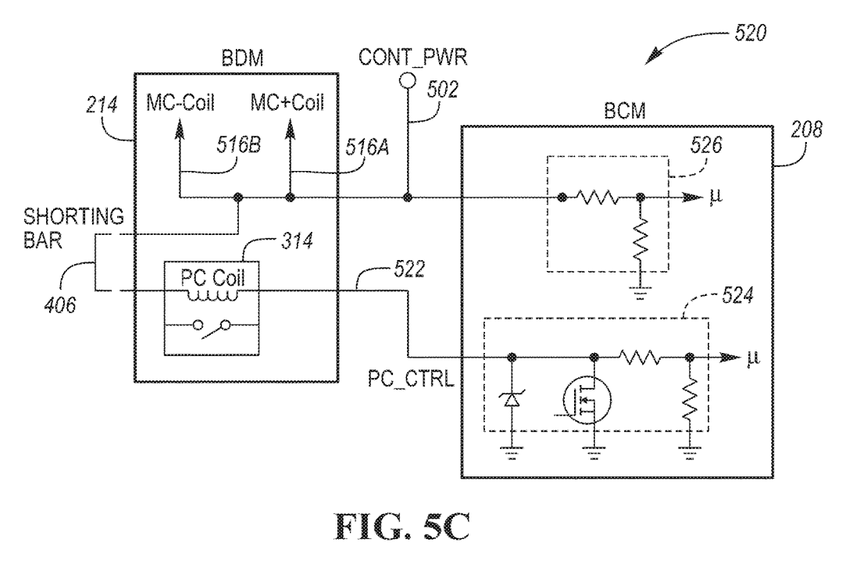
FIG. 5C is a schematic diagram illustrating an internal circuit to provide a high voltage interlock, pre-charge contactor control, and contactor power over two conductors between the BCM to the BDM.

FIG. 5C is a schematic diagram illustrating an internal circuit 520 to provide a high voltage interlock, pre-charge contactor control, and contactor power over two conductors within a connector. The two conductors are a multiplexed pre-charge contactor control 522 (PC_CTRL) and a multiplexed power line. The multiplexed pre-charge contactor control 522 multiplexes the functionality of a first sense line 408A and a pre-charge control signal 504, the multiplexed power multiplexes the functionality of a second sense line and a low voltage power source 502. In other embodiments, a solid state switch located in the BDM 214, such as a MOSFET, BJT, or smart MOSFET, may be used to drive the pre-charge contactor in response to PC_CTRL 522. The multiplexed power may be coupled with a second sense circuit 526. The second sense circuit 526 provides isolated power with an ability to detect an impedance of the shunt 406 and the electrical connection of the shunt 406. This simplified representative circuit of the second sense circuit 526 includes a resistance network to provide voltage isolation via allowing a current through resistors of the network. Also, a simplified representative circuit of the first sense circuit 524 includes two resistors in a "T" configuration to provide isolation of the first sense line while allowing the impedance to be measured between the first sense line and the second sense line. The first sense circuit 524 also is shown with a solid state switch configured as a pull-down or low-side switch. For example, the N-channel MOSFET shown is configured as an open drain so that when the MOSFET is turned off, the drain floats and allows measurement of the impedance. When the MOSFET is turned on, the MOSFET pulls PC_CTRL 522 down to ground thus energizing the pre-charge coil 314. A diode is added in parallel with the MOSFET to protect the MOSFET when it is turned off and a field has been energized in the pre-charge coil 314. Although shown here as a low-side pull down, the multiplexed pre-charge control signal 522 may be a digital signal transmitted from the BCM 208 to the BDM 214 that is then decoded to activate the pre-charge contactor. Also, the multiplexed pre-charge control signal 522 may be a digital signal that is modulated at a frequency distinct from the low frequencies or DC voltage used to monitor the impedance of the shunt 406 and the connections of the shunt 406.

Here, the multiplexed power of the second sense line and the low voltage power source 502 is shown to provide power to BDM electric circuitry including a positive main contactor coil 516A a negative main contactor coil 516B, a precharge contactor 314, and is used to detect the presence and impedance of the shunt 406. The type of resistor of both the first and second sense circuit 524 and 526 may be high precision resistors such that when measuring the impedance of the shunt 406 when placed in series with the pre-charge coil 314, the impedance of the shunt 406 and the connections of the shunt to the BDM may be accurately determined. Further, as the power flowing from CONT_PWR 502 is multiplexed onto the same multiplexed power line, by having the return path of CONT_PWR 502 independent from the PC_CTRL 522 also allows separate paths of current flows to aid in isolation such that an accurate measurement may be obtained.

Figure 5D:
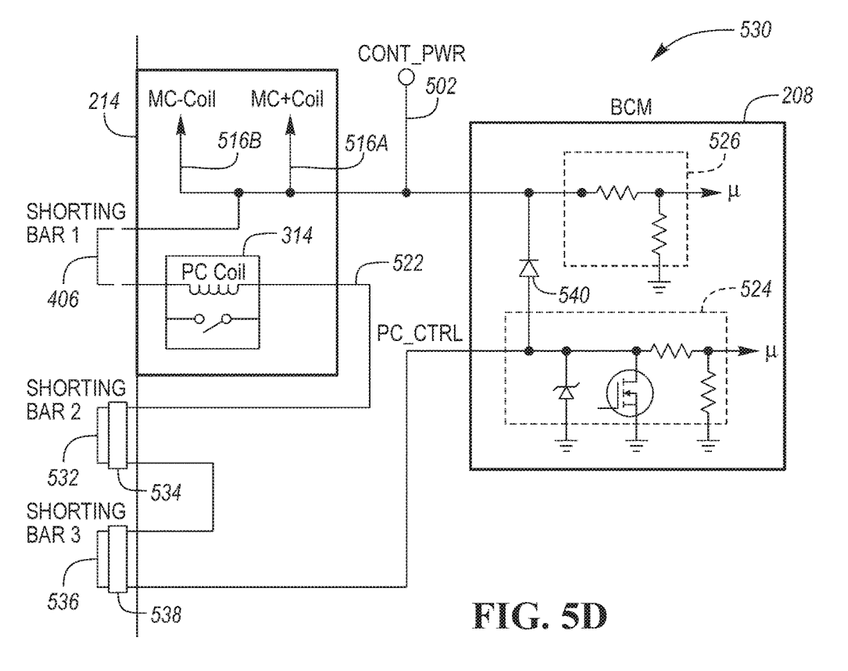
FIG. 5D is a schematic diagram illustrating an internal circuit to provide multiple high voltage interlocking shorting bars, pre-charge contactor control, and contactor power over two conductors between the BCM to the BDM.

FIG. 5D is a schematic diagram illustrating an internal circuit 530 to provide multiple high voltage interlocking shorting bars, pre-charge contactor control, and power over two conductors between the BCM to the BDM. Here, two additional connectors are added each requiring a shunt. A second shorting bar or second shunt 532 is associated with a second shunt connector 534 and a third shorting bar or third shunt 536 is associated with a third shunt connector 538. Due to the additional connections of each connector, the impedance of the high voltage interlock circuit may increase. Further, Although shown with a pull-down to ground the first sense circuit 524 may be configured to have a pull-down to a voltage above ground, for example, the pull-down may be in series with a Zener diode or other voltage reference such that the pull-down may only reduce the voltage by a voltage less than the low-voltage supply. For example, if CONT_PWR is 12V, use of a low-side pull-down to ground would result in approximately 12V being applied to the pre-charge coil 314. However, when the pull-down is in series with regulator, then a low-side pull-down to the regulator may drop the voltage from 12V to 10V, a 2 volt difference. This reduced voltage signal may be beneficial to modulate a digital signal from the BCM 208 to the BDM 214 in which the digital signal is logic level or TTL level instead of the level of the low-voltage battery. Further, modulation may be based on a certain number bit such as 4-bits, 8-bits, 16-bits, 32-bits of more. In general, a low-side switch may be an NPN BJT or an N-channel MOSFET.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A high-voltage interlock system comprising:
    a first module including a contactor and a shunt connection configured to couple a shunt in series with a coil of the contactor; and
    a second module, coupled with the first module via a first wire multiplexed with low-voltage power and a second wire, and configured to, responsive to impedance of the shunt connection measured across the first and second wires exceeding a predetermined value, disengage the contactor.

2. The high-voltage interlock system of claim 1, wherein the second wire is a sense line to measure the impedance of the shunt connection and is multiplexed with a signal to engage the contactor.

3. The high-voltage interlock system of claim 2, wherein the second wire is coupled with a low-side solid state switch in the second module configured to sink current to energize the coil of the contactor.

4. The high-voltage interlock system of claim 1, wherein the second module is further coupled with the first module with a third wire that is a dedicated signal to engage the contactor.

5. The high-voltage interlock system of claim 4, wherein the third wire is coupled with a low-side solid state switch in the second module configured to sink current to energize a coil of the contactor.

6. The high-voltage interlock system of claim 1, wherein the shunt connection includes at least two shunt connections that are coupled in series.

7. A high-voltage interlock system comprising:
    a first module including a contactor and a shunt connection configured to couple a shunt in series with a coil of the contactor; and
    a second module, having first and second circuits, coupled with the first module via first and second wires, and configured to, in response to impedance of the shunt connection exceeding a threshold, inhibit a signal to engage the contactor, wherein the impedance is measured across the first and second wires while the first wire is multiplexed with low-voltage power to energize a coil of the contactor, and the second circuit is multiplexed with the signal to engage the contactor.

8. The high-voltage interlock system of claim 7, wherein the contactor is a pre-charge contactor.

9. The high-voltage interlock system of claim 7, wherein the contactor is an auxiliary or DC fast charge contactor.

10. The high-voltage interlock system of claim 7, wherein the first module further includes a main high-voltage power contactor.

11. The high-voltage interlock system of claim 7, wherein the first circuit includes a resistor network having a Pi configuration.

12. A method of performing a high-voltage interlock comprising:
    transmitting, to a pre-charge contactor coil via a pre-charge terminal, a turn-on signal responsive to a pre-charge request while an impedance, measured across the pre-charge terminal and a power terminal, is below a threshold;
    energizing main contactor coils, after a predetermined time, to couple a high-voltage battery to a high-voltage subsystem; and
    responsive to the impedance exceeding the threshold, de-energizing the main contactor coils to isolate the battery.

13. The method of claim 12, wherein energizing the pre-charge contactor coil is activating a low-side solid state switch coupling the pre-charge contactor coil with a low-voltage battery.

14. The method of claim 13, wherein the low-side solid state switch is an N-channel metal oxide semiconductor field effect transistor (MOSFET) or a NPN bipolar junction transistor (BJT).

15. The method of claim 12, wherein the threshold includes an upper threshold and a lower threshold.

16. The method of claim 12, wherein the impedance is associated with connections of at least one shunt applied across the power terminal and the pre-charge terminal.

17. The method of claim 16, wherein the at least one shunt is two shunts and the shunts are coupled in series.

\* \* \* \* \*